United States Patent
Hahn

Patent Number: 5,521,474
Date of Patent: May 28, 1996

[54] METHOD FOR MONITORING MOVABLE ELEMENTS

[75] Inventor: Helmut Hahn, Erkrath, Germany

[73] Assignee: Delphi Automotive Systems Deutschland, Germany

[21] Appl. No.: 340,158

[22] Filed: Nov. 15, 1994

[30] Foreign Application Priority Data

Nov. 18, 1993 [DE] Germany .................. 43 39 365.9

[51] Int. Cl.$^6$ ............................................. E05F 15/10
[52] U.S. Cl. .................. 318/285; 318/266; 318/286; 318/468
[58] Field of Search ................................. 318/256, 264, 318/265, 266, 272, 275, 280, 283, 285, 286, 434, 466, 467, 468, 469, 470; 388/903, 907.5; 49/26, 28

[56] References Cited

U.S. PATENT DOCUMENTS

| | | | |
|---|---|---|---|
| 4,347,465 | 8/1982 | Goertler et al. | 318/266 |
| 4,746,845 | 5/1988 | Mizuta et al. | 318/286 |
| 5,410,226 | 4/1995 | Sekiguchi et al. | 318/266 |
| 5,422,551 | 6/1995 | Takeda et al. | 318/265 |

FOREIGN PATENT DOCUMENTS

| | | |
|---|---|---|
| 2926938 | 1/1981 | Germany. |
| 3303590 | 8/1984 | Germany. |

*Primary Examiner*—Bentsu Ro
*Attorney, Agent, or Firm*—Reising, Ethington, Barnard & Perry

[57] ABSTRACT

In order to improve a method for monitoring movable elements, in particular windows and sunroofs in motor vehicles, such that an object clamped between the movable parts and the part at rest is detected in a reliable fashion, the force acting upon such objects is maintained at the lowest possible value and the direction of the window is inverted as rapidly as possible. In order to ensure a reliable protection, a cutoff threshold consists of a constant component and a variable component, with the size of the difference (Dn) between the cutoff threshold and the instantaneous value of the rotation time (tu) influencing the switching signal.

11 Claims, 2 Drawing Sheets

METHOD FOR MONITORING MOVABLE ELEMENTS

FIELD OF THE INVENTION

This invention relates to monitoring of movable closures, such as power actuated doors and windows, to prevent harmful clamping of an object by the closure.

BACKGROUND OF THE INVENTION

There exist safety devices in motor vehicles which are intended to prevent injuries to persons and animals while automatically closing windows, doors or sunroofs that are operated electrically, pneumatically or hydraulically. In order to detect if a foreign body is clamped between a movable part and a stationary part, it is known to monitor the power consumption, the rotating speed of the driving motor or to utilize temperature sensors which respond and generate a signal indicative of a foreign body situated between the movable part and the stationary part.

German Patent No. 2,926,938 C2 discloses a device for driving a movable element which utilizes the operating current of the driving motor as a value for detecting if a foreign body is clamped between the movable part and the stationary part. In addition, the rotation speed of the motor is mentioned as one additional parameter. A resistor of low value in series with the electric motor is used as the sensor and the voltage, which is proportional to the operating current, is measured across the resistor. Since the motor current increases with the torque generated by the motor, the current increases with the load encountered by the motor. A voltage, which is proportional to the current, is transmitted to a switching logic circuit. If this voltage exceeds a preset value, the electric motor is switched off. In order to make it possible to differentiate between the resistance to movement of the part and instances in which an object is clamped in the opening, both of which cause an increase of the motor current, the increase of the motor current is measured within a predetermined time interval and compared to a cutoff threshold. This cutoff is triggered only if the differential quotient dI/dt exceeds this cutoff threshold and the sum of two successive current values that lie above a first cutoff threshold exceeds a second cutoff threshold. The expenditures associated with the circuit technology for realizing this method are quite high. In addition, it is not ensured that a constant clamping force exists over the entire duration of the closing process. The two cutoff thresholds are preadjusted constants. However, this method is only suitable for isolated instances because the actual values of the cutoff thresholds are subject to fluctuations due to the manufacturing tolerances of the driving motor and the movable elements as well as the mechanical drive elements provided for the movable element. In addition, all components are dependent on temperature and an aging process, both of which alter the values of the cutoff thresholds unpredictably. Consequently, it is not ensured that an evenly maintained permissible clamping force is present as a triggering criterion over the entire duration of the closing process.

German Patent No. 3,303,590 A1 discloses a method in which pertinent data is recorded during the closing process and it is continuously related to a stored power-path diagram of a closing process that was carried out previously in an undisturbed fashion. For this purpose, information about the instantaneous window position, the moving direction of the window and the power consumption of the driving motor is transmitted to a computer unit which subsequently corrects the data of the undisturbed path-time diagram as a function of these parameters, compares said data with a predetermined power tolerance limit and interrupts or reverses the motor current as a function of the result of this comparison. The tolerance limit has different values for the normal range: and the final range of the closing process. This method also utilizes the rotation speed and the power consumption as measuring parameters.

SUMMARY OF THE INVENTION

The invention is based on the objective of improving the monitoring of movable closures in such a way that an object clamped between the moving part and the stationary part may be detected in a reliable fashion, that only a small force acts upon the object, and that the reversal of the direction of the window is initiated as rapidly as possible.

According to the invention achieved which provides the advantage that counterforces which occur during the closing process are detected and differentiated early, and that a compensation of interferences caused by the system is carried out. The division of the measurement curve into intervals (Ii) creates a piecewise linearization and allows a precise observation of the revolution time (tu) of the motor as well as its approximation to a value that is proportional to the permissible clamping force. The formation of a cutoff threshold from a constant component and a variable component is based on the fact that a constant cutoff threshold is not able to compensate fluctuations in speed which occur normally due to friction, play, changes in the voltage, etc.

At the beginning of each interval (Ii), the first measured revolution time (tu) of the motor is recorded as a starting value. A time which is proportional to the defined clamping force then is added to the starting value and consequently forms the cutoff threshold. This cutoff threshold is constant and is referred to the starting value for the individual interval (Ii). This is associated with the disadvantage that the actual instantaneous difference (Dn) may be smaller due to fluctuations of the system which occur normally. Consequently, the clearance distance is reduced.

In order to maintain the clearance distance constant even during fluctuations in speed caused by the system, a coefficient of correction which forms a compensating range is added to the motor revolution time. This coefficient of correction represents the variable component of the cutoff threshold. The variable component is an empirically determined range of values that lies between the minimum and the maximum fluctuation of the revolution time from the nominal value during an undisturbed closing process. An actual clamping force generates more intense and substantially higher fluctuation in the speed than a fluctuation caused by the system. The monitoring range is reached once the change in the revolution time (tu) of the motor exceeds the compensating range. This leads to the fact that a new interval (Ii) is started immediately. This measure prevents the clamping of an object which occurs at the end of an interval (Ii) from being detected only once a relatively high clamping force is present. The start of a new interval (Ii) caused by the interference is only possible in the next interval (Ii) because a continuous compensation of the interferences would be carried out otherwise. If the clamping force increases additionally beyond the monitoring range, a clamping protection is triggered within a cutoff range. The movable object is stopped and displaced in the opposite direction.

Interferences which, for example, are caused by the ignition occur in the voltage supply of a motor vehicle.

These interferences in turn cause an increase in the revolution time (tu) of the motor. These interferences also are registered and compensated by the method according to the invention. In addition, the direct correlation between the voltage and the torque of the motor facilitates an adaptation of the cutoff threshold which depends on the force to the actual operating voltage.

In order to evaluate the revolution time behavior while starting and stopping the movable element which fluctuates from the normal operation, the length of the corresponding intervals (Ii) is altered in these ranges. In the final range, namely shortly before the window is displaced into its window seal, the length of the intervals is very short.

The evaluation of the measured values is carried out by a microcomputer, so that only a few components are necessary for realizing the method according to the invention. The conventional number of components is reduced, which allows a compact construction. In addition, the microcomputer does not require a large memory because only the instantaneous and the previous value of the revolution time (tu) of the motor must be stored in addition to a few positional values.

The universal applicability of this method is attained by means of an automatic initialization of the movable element. During the initial closing of the opening, namely until the movable element has reached its final resting position, the sensors detect the position of the movable element and transmit these positions to the memory as a reference value. An automatic operation of the movable element is possible only after this initialization. The characteristic memory value divides the closing path of the movable element into two ranges. The protection is fully active within the lower range. The upper range is defined in such a way that no clearance may be present between the movable element and the corresponding frame construction. The protection is eliminated within this range, so that an unproblemmatic displacement of the movable element into the final position is possible and it is ensured that no object may be clamped between the movable element and the frame construction.

The invention is described in detail below with the aid of the embodiments illustrated in the figures.

BEST MODE FOR CARRYING OUT THE INVENTION

Figure 1:
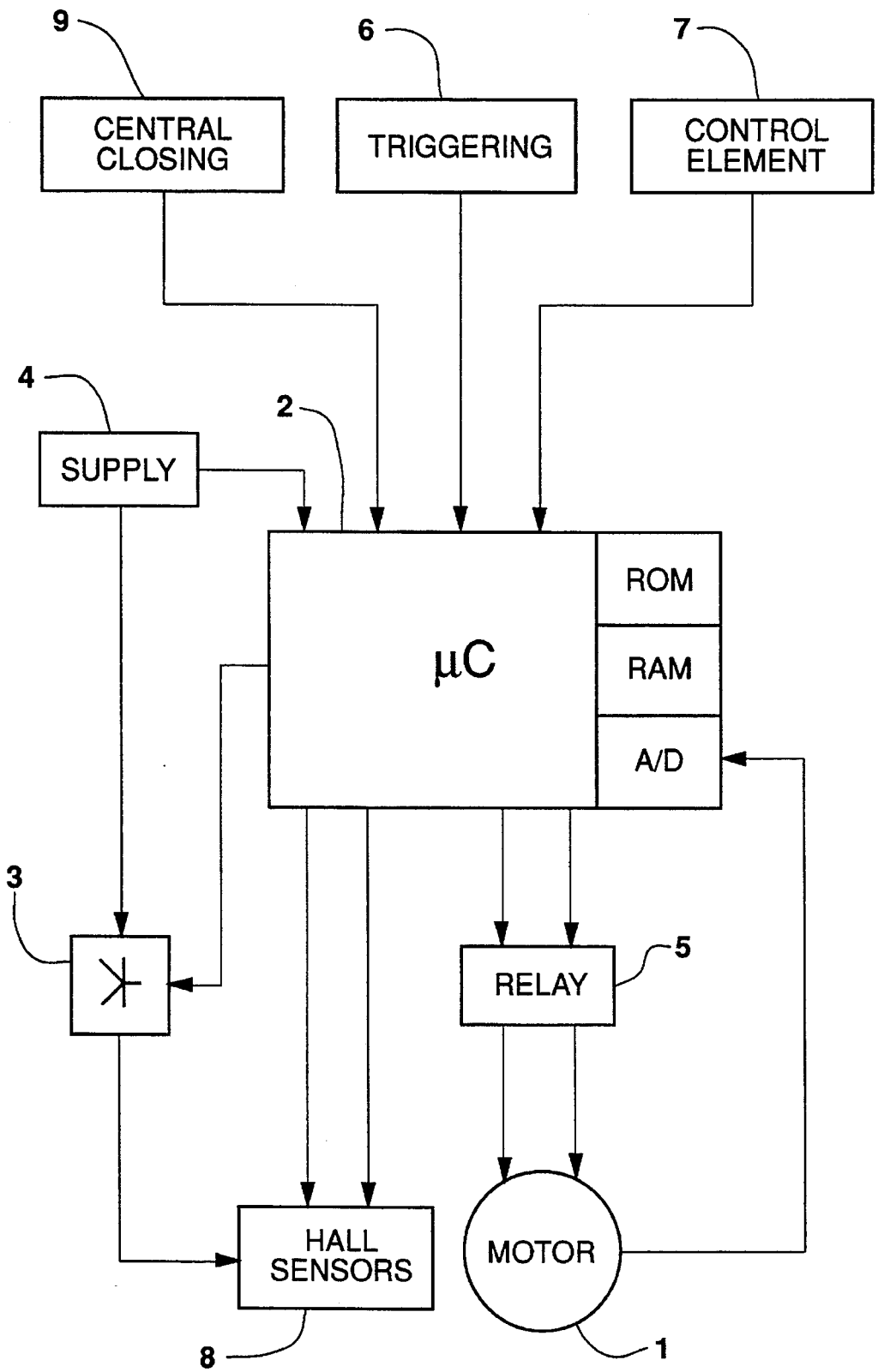
FIG. 1 shows a block diagram of a circuit arrangement which performs the method of this invention.

The basic interaction of individual components of an electrical window control circuit of a motor vehicle is explained below with reference to the block diagram in FIG. 1. The description is given with reference to an electrical power-actuated window or sliding roof. It is likewise possible to control a drive motor for an automatic door closer, or the like, using the method according to the invention.

A reversible drive motor 1 is provided for actuating a moving element (not illustrated) such as a window pane or a sliding roof in opposite directions. A mechanism which converts the rotation of the motor shaft into a linear movement is connected between the motor 1 and the window pane. A microcomputer 2 and an electronic switch 3 are supplied with voltage via an onboard power supply 4 of the motor vehicle. The microcomputer 2 controls the motor 1 via a relay 5. The window control circuit does not become operational until the vehicle ignition 6 is switched on and can then be controlled to open or close by control switches 7 which are placed, for example, in the door panels or center console of the motor vehicle. The control switches 7 cause the window pane to be moved by an electric motor under control of the microcomputer 2 and the relay 5. While the window opening is being closed, the time (tu) per motor revolution (N) is measured and is transmitted to the microcomputer 2. If the motor vehicle is equipped with the "central closing" function 9, that is to say all the vehicle doors are locked from a central position, the window control circuit also causes all the window panes and the sliding roof to be moved into the rest position.

Two Hall sensors 8 supply the microcomputer 2 with the data on the rotation direction and the revolution time (tu) of the motor 1. Information on the position of the window pane is also obtained from this data. The Hall sensors 8 are arranged and connected so that small fluctuations of the motor shaft will not trigger false position pulses. In order to reduce the current consumption, the Hall sensors 8 are switched off by the microcomputer 2, via the electronic switch 3, when not being operated. All the measurements are detected and processed by the microcomputer 2 and all the actions to be carried out are controlled in this way.

Immediately after installation of the window control system in the motor vehicle, the system can be operated only in the manual mode. The window pane is moved up or down only as long as the corresponding control element 7 is pressed, that is to say the window control system has no automatic protection function at this time. The initial closing of the window is used for initialization of the automatic protection system. The Hall sensors 8 transmit the rotation direction and the pulses per motor revolution N to the microcomputer 2. The microcomputer 2 detects the rotation direction, and thus the closing of the window, and adds the pulses per motor revolution until the window pane is stopped. The final position is stored as a reference in a memory in the microcomputer 2. After this, the automatic control with protection against clamping is active. As a result of this initialization process, the window control system can be used universally since no specific values relating to the frame dimensions or to the movement distance need to be read into the microcomputer 2 in advance.

A blocking range in which the automatic protection is not operational is established by the microcomputer 2. This blocking range is provided in the vicinity of the closed position of the window pane. The lower limit of the blocking range is established at a window pane position which leaves only a small clearance or opening so that no object could enter the open space and be clamped by the window pane. The upper limit of the blocking range is established beyond the normal closed position of the window in order to allow for the possibility that the window seal will expand due to aging or use and thereby ensure that the window will be fully closed in such case.

The automatic protection system is implemented on the basis of the motor revolution time as a direct force-dependent variable. The revolution time (tu) of the motor 1 is the time in which the motor shaft carries out one complete revolution (N). One revolution (N) without any influence from disturbing forces results in a constant movement of the window pane. If disturbance forces act on the window pane, then the revolution time (tu) is increased. As well as actual clamping of an object, disturbance variables are understood to include, for example, dirt or mechanical play in the guide elements. In order to prevent clamping of an object by the window pane, the drive motor 1 must be switched off or its rotation direction reversed. A defined maximum permissible clamping force is converted into a proportional increase in the revolution time (tu) and is stored as a basic value for the definition of a switching-off threshold in the microcomputer 2.

Figure 2:
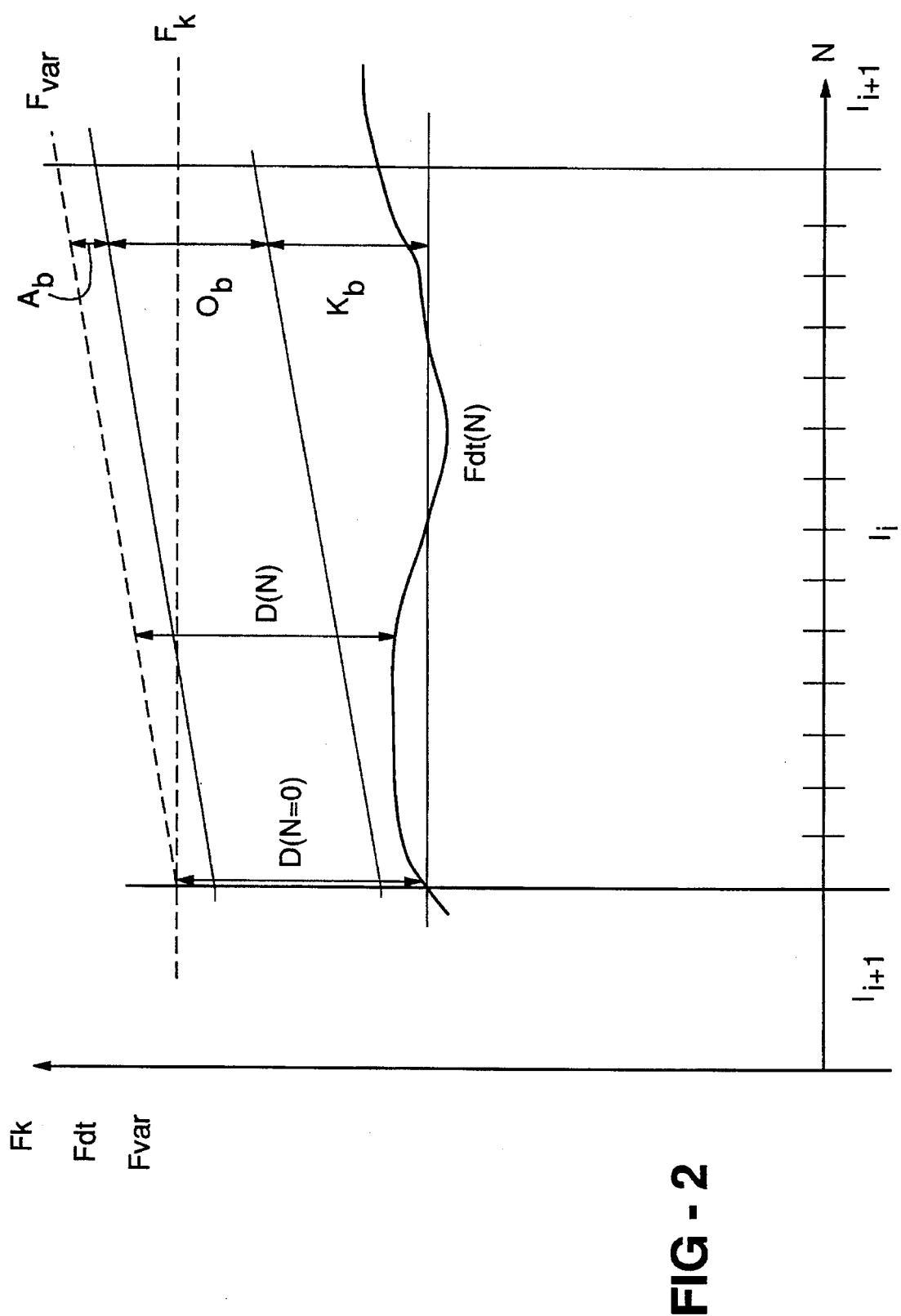
FIG. 2 is a diagram of a closing process in which the revolution time (tu) of the motor is shown over the interval length.

The determination of the essential characteristic values during movement of the window pane in the closing direction is explained with reference to the diagram of FIG. 2. The diagram shows a section of the response of the revolution time (tu) of the motor 1 per motor step. Each closing operation of the window is an intrinsically completed action, that is to say no parameters are transferred from preceding actions. The values to be read in are only buffer-stored until the next value to be read in. In FIG. 2, the response of the measurement curve has been idealized so that a continuous line can be seen. In reality, the curve is composed of points since only one corresponding revolution time (tu) can be assigned to each step, that is to say to each complete motor revolution. Each step thus corresponds to one position of the window pane. An interval (Ii) is formed from in a specific number of steps, these intervals (Ii) having no fixed relationship to the window position. The length of the intervals (Ii) is constant with the exception of the first and last intervals (Ii). When the motor 1 is started the starting-up phase of the system takes place in that interval (Ii). All the other intervals (Ii) are operating phases. In the final region before the window pane moves into a seal, the interval length is automatically changed. The measurement curve is linearized on a piecemeal basis by splitting said measurement curve into intervals (Ii).

If no signal for the revolution time (tu) is supplied from the motor shaft immediately after a motor start, then a rigid obstruction is blocking the window pane and the protection system is triggered by this static condition. In the event of a dynamic start of the motor, the mechanical play must be compensated for, which leads to a transient in the measurement curve. The magnitude and duration of this transient are dependent on the mechanism used and on the preceding rotation direction. However, the protection system becomes active after the first revolution.

The following assessment criteria apply to the automatic protection against clamping: at the start of each interval (Ii), the first revolution time (tu) is measured which then applies as the reference value until the end of the interval (Ii). The microcomputer 2 uses this value to calculate a function (Fk) for a first component of a cut-off threshold, The amplitude of the function (Fk) is constant and is higher than the reference value by a time value which is proportional to the permissible clamping force. The amplitude is originally dependent on the operating voltage of the motor 1 since this influences the torque of the motor 1 and, in consequence, the clamping force. The resistance of the window pane to movement and the clamping of an object produces a force-dependent increase in the revolution time (tu) so that there is a direct relationship between these parameters. In consequence, the difference (DnO) between the first component Fk of the cut-off threshold and the reference value is constant over the entire length of the interval (Ii) and represents a first approximation. This difference, without further compensation, has the disadvantage that the actual instantaneous difference (Dn) in cut-off threshold time can be smaller as a result of normal fluctuations (friction, play, etc.) which occur in the system. In consequence, the safety margin is affected and may be reduced. Since an actual clamping force produces a considerably greater deviation than normal fluctuations, it is desirable to compensate for system-dependent fluctuations. In order to keep the difference (Dn) approximately constant, a correction function (Fvar) is calculated which forms the second component of the cut-off threshold. The amplitude of this correction function (Fvar) exceeds the function (Fk) and is variable. The maximum value of the correction function (Fvar) represents the maximum acceptable clamping force. The cut-off threshold for the protection system is thus composed of a constant component (Fk) and of a variable component (Fvar).

In order to facilitate a reliable evaluation of an increase in the revolution time (tu), a compensation region (Kb) is provided which amounts to, for example, 80% of the difference (DnO). If the change in the revolution time (tu) of the motor 1 exceeds compensation region (Kb), then a monitoring region (Ub) is reached, which is also defined as a percentage of the difference (DnO). This results in a new interval (Ii+1) being started immediately. This prevents the clamping of an object which occurs at the end of an interval (Ii) from being detected when a relatively high clamping force occurs. This disturbance-dependent restarting of an interval (Ii) is not allowed to occur again until the next interval (Ii) since continuous compensation for disturbances would otherwise take place. If the change in the revolution time (tu) continues in the restarted interval (Ii) then a triggering region (Ab) is reached after leaving the monitoring region (Ub), and the motor 1 is switched off or its rotation direction is reversed. The clamping force then reaches the limit of the maximum permissible value. If, in contrast, the rise in the revolution time (tu) does not continue, then the interval (Ii) continues until its end without any disturbance. Subsequently, the normal measurement recording on the basis of intervals is continued. Each operation of the window lifter represents one separate operation. This means that no parameters are transferred from preceding operations, except for specific position values. The revolution times (tu) to be read into the microcomputer are buffer-stored only until the next value is read in. The calculated cut-off threshold is stored in the microcomputer 2 and is incorporated into the recording and evaluation of the measured values only in the event the difference (Dn) decreases, in order to initiate the compensation or restarting of an interval (Ii). In addition to the already mentioned disturbances, the system also compensates for voltage drops system, which result in an increase in the revolution time (tu).

The method according to the invention does not use time intervals for evaluation of the disturbance forces occurring, but uses only position values, so that the progression of the disturbance forces may be arbitrary. An evaluation of the progression of the disturbance forces is not carried out.

| List of reference symbols | |
| --- | --- |
| 1 | Motor |
| 2 | Microcomputer |
| 3 | Electronic switch |
| 4 | Electrical system |
| 5 | Relay |
| 6 | Ignition |
| 7 | Operating elements |
| 8 | Hall sensors |
| 9 | Central closing device |
| Ii | Interval |
| N | Revolution |
| tu | revolution time |
| Kb | Compensating range |

-continued

| List of reference symbols | |
| --- | --- |
| Ub | Monitoring range |
| Ab | Cutoff range |
| Fk | First component of the cutoff threshold |
| Fvar | Variable component of the cutoff threshold |
| Dn | Difference |

What is claimed is:

1. Method for monitoring movable elements, in particular windows and sunroofs in motor vehicles, in order to ensure that objects are not clamped between the movable parts and the part at rest, with an electric motor (1)

with sensors (8) for sensing the revolution time (tu) and the rotating direction of the electric motor (1), with an evaluation unit (2) which compares the value of the revolution time (tu) that was determined last with a cutoff threshold within position intervals (Ii), the length of which depends on the position of the movable element inside of the frame construction, and generates at least one switching signal, with a switching element (5) which is triggered by the switching signal and causes the electric motor (1) to be switched off or reversed, characterized by the fact that the cutoff threshold is referred to the revolution time (tu) at the beginning of each interval (Ii), that the cutoff threshold consists of a constant component and a variable component, and that said variable component is an empirically determined range of values that lies between the minimum and the maximum fluctuation of the revolution time (tu) from the nominal value during an undisturbed closing process, with the magnitude of the difference (Dn) between the switching threshold and the value of the revolution time (tu) that was determined last causing the switching signal to become effective or remain ineffective.

2. Method according to claim 1, characterized by the fact that the difference (Dn) is divided into a compensating range (Kb), a monitoring range (Ub) and a cutoff range (Ab), with the revolution time (tu) influencing the switching signal negatively in the compensating range (Kb), generating a signal which causes the immediate start of a new interval (Ii+1) during the actuation of the system in the monitoring range (Ub), and influencing the switching signal positively in the cutoff range (Ab).

3. Method according to claim 1, characterized by the fact that the changes in the revolution time (tu) which are caused by fluctuations in the supply voltage are detected.

4. Method according to claim 1, characterized by the fact that the variable component of the cutoff threshold is calculated from a linear function.

5. Method according to claim 2, characterized by the fact that the cutoff threshold is incorporated into the calculation only at the positions at which the revolution time (tu) leaves the compensating range (Kb).

6. Method according to claim 1, characterized by the fact that the length of the intervals (Ii) at the beginning and the end of the actuation differ from the length of the normal intervals.

7. Method according to claim 1, characterized by the fact that a microcomputer (2) is used as the evaluation unit.

8. Method according to claim 1, characterized by the fact that the instantaneous and the previous measured values of revolution time are required for evaluating the difference (Dn).

9. Method according to claim 1, characterized by the fact that the cutoff threshold for the protection is switched off during an actuation once a blocking range has been reached.

10. Method according to claim 7, characterized by the fact that the sensors (8) detect that the movable element has reached the final position during an initialization process, and that the microcomputer (2) stores this final position as a reference value in order to calculate the limits of the blocking range from this reference value.

11. Method according to claim 9, characterized by the fact that the blocking range begins at the location at which no clearance exists between the movable element and the frame construction.

* * * * *